(12) United States Patent
Bhattacharyya et al.

(10) Patent No.: US 8,261,296 B2
(45) Date of Patent: Sep. 4, 2012

(54) INVOCATION CHANNEL

(75) Inventors: Anamitra Bhattacharyya, Chelmsford, MA (US); Alfredo Cortes, London (CA); Boris Dozortsev, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 12/170,131

(22) Filed: Jul. 9, 2008

(65) Prior Publication Data

US 2010/0011376 A1 Jan. 14, 2010

(51) Int. Cl.
*G06F 3/00* (2006.01)
*G06F 9/54* (2006.01)

(52) U.S. Cl. .......................... 719/330; 719/313; 719/320

(58) Field of Classification Search .................. None
See application file for complete search history.

(56) References Cited

U.S. PATENT DOCUMENTS

| | | | |
|---|---|---|---|
| 7,010,796 B1 * | 3/2006 | Strom et al. ................... | 719/328 |
| 7,827,562 B1 * | 11/2010 | Hoerle et al. ................... | 719/313 |
| 2003/0182395 A1 * | 9/2003 | Lynch et al. ................... | 709/218 |
| 2003/0188043 A1 * | 10/2003 | Woodall et al. ............... | 709/328 |
| 2009/0217311 A1 * | 8/2009 | Kocyan et al. ................ | 719/328 |

\* cited by examiner

*Primary Examiner* — Qing Wu
(74) *Attorney, Agent, or Firm* — Steven L. Nichols; Van Cott, Bagley, Cornwell & McCarthy P.C.

(57) ABSTRACT

Creating interoperability between a calling entity and an external service includes configuring an invocation channel using codeless process, designating the external service, passing source data from the calling entity to the invocation channel, the invocation channel formatting the data, invoking a connection to the external service, and passing the data over the connection to the external service.

26 Claims, 3 Drawing Sheets

INVOCATION CHANNEL

BACKGROUND OF THE INVENTION

Aspects of the present specification relate in general to computer processing and, more specifically, to the automation of tasks and interoperability of applications within computer systems.

In modern computer systems, a number of applications and services can be used to fulfill a user's needs. In many cases, the applications and services may use different data formats, communication protocols, and logic. The interoperability between these applications and services depends on the system's ability to translate between these different data formats, make the desired connections between the applications, and access the logic of the various services. As business or other needs arise, the users of the computer system may desire to create responsive combinations of various elements or functionalities with the computer system that are not natively compatible.

BRIEF SUMMARY OF THE INVENTION

A method for creating interoperability between a calling entity and an external service includes configuring an invocation channel using a codeless process; designating the external service; passing source data from the calling entity to the invocation channel, the invocation channel formatting the data, invoking a connection to the external service; and passing the data over the connection to the external service. A computer program product for interoperability between a calling entity and an external entity includes computer usable program code configured to: accept a source object from the calling entity and serialize the source object into an eXtensible Markup Language (XML) message; transform the XML message into a second message having a data format compatible with the external entity; invoke a connection with the external entity and communicate the second message to the external entity; and transmit a response back to the calling entity.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
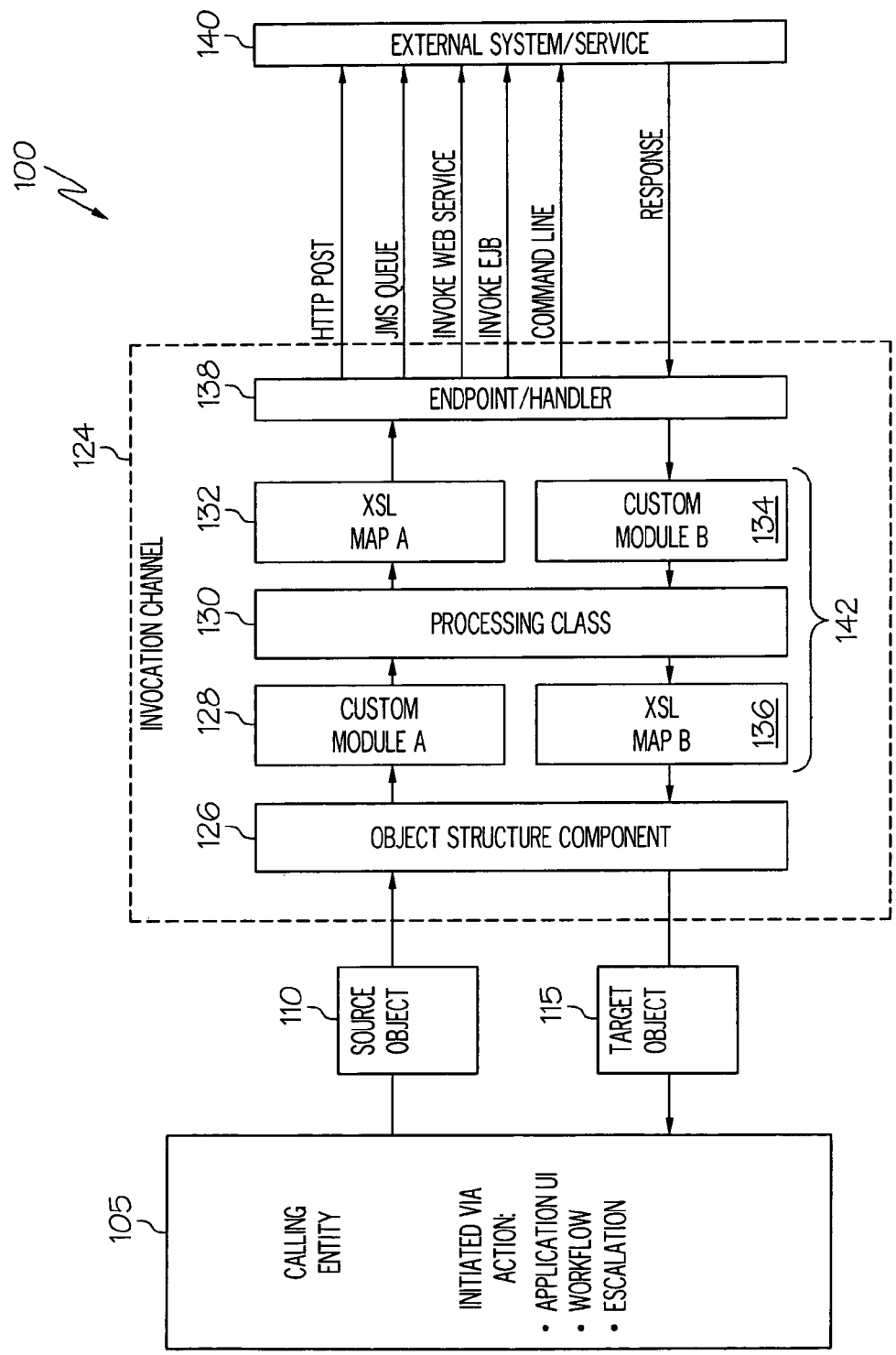
FIG. 1 is a diagram of an illustrative invocation framework, according to one embodiment of principles described herein.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a diagram showing an illustrative invocation framework (100) which utilizes an invocation channel (124) to create interoperability between a calling entity (105) and an external system or service (140). As noted above, the calling entity (105) and external system or service (140) may use different data formats, communication protocols, and logic. The invocation channel (124) automatically bridges the gap between the calling entity (105) and the external system or service (140) by performing logical operations, formatting and translating data, collecting connection data, invoking a connection to the external system or service (140), and processing a response. According to one exemplary embodiment, the invocation channel (124) contains multiple segments of prewritten logic that can be accessed and customized through a user interface.

A simple hypothetical situation illustrates the usefulness of the invocation channel (124) in bridging the gap between a calling entity (105) and an external system or service (140). In this example, the calling entity may be an automated workflow that, as part of its output, is to generate a printed image on paper. The information technology (IT) infrastructure includes three printers from various manufacturers. Each of these printers has varying capabilities, communication protocols, and data format requirements. One of these printers will be the external system or service (140) in this example.

Initially, the automated workflow creates a "print" source object which is passed into the invocation channel (124). The invocation channel (124) consists of various modules which interpret the source object, determine which external system or service (140) is best suited to execute the source object, format the data within the source object to be compatible with the selected external system or service (140), invoke a connection with the external system or service (140), and transmit the formatted request and data to the external system or service (140) for execution. In this example, the invocation channel (124) selects a printer to execute the print job, formats the print command and image data so that they are compatible with the selected printer, invokes a connection to the printer, and passes the formatted information to the select printer for execution.

The example above is simplified in many respects to better communicate the general role of an invocation channel (124). In an actual implementation of the above example, other elements and considerations might be included. For example, the invocation channel (124) may actually interface with intermediate printer software, printer drivers, and other elements.

In other applications, the source objects (110) generated by the calling entity (105) may require significantly more complex functionality within the invocation channel (124). For example, if a software patch is to be distributed to all machines within an organization that have a specific operating system, the calling entity (105) may generate a "patch" source object (110) which contains the patch software and other needed data. In one embodiment, the invocation channel (124) would then determine which machines require the update and what method should be used to install the update on each target machine.

If the invocation channel (124) determined that an appropriate installation service existed on each machine, it would gather the required credentials to access the target machines, and format the data as required for each target machine, invoke the connections to the target machines and pass the data to the installation service. If a response was required (such as "installation complete"), the invocation channel (124) would accept the response data, format it, and route it back to the appropriate calling entity (105).

A variety of methods can be used to initiate the invocation channel (124). The invocation channel (124) may be invoked by automated processes or processes that have an active human user. By way of example and not limitation, an automated or semi-automated invocation may be initiated by an application user interface (UI), a workflow, field validation, event listener, application programming interface, or an escalation.

According to one exemplary embodiment, the invocation channel (124) includes an object structure component (126), a custom module A (128), a processing class (130), and an eXtensible Sheet Language (XSL) map A (132). The logical processing flow of source objects progresses through the invocation channel (124) as shown by arrows pointing to the right. When the invocation channel (124) is invoked, a source object (110) is passed into the invocation channel (124). The source object (110) contains data and/or relationships that are to be used by the external system or service (140) to execute the desired operation. The source object (110) is comprised of one or more business objects. Each business object contains a single type of data. When business objects are combined to form a source object, the relationships and hierarchy of the combined business objects are captured in the source object. For example, a source object (110) for an invocation channel 'People' could be made up of a business object 'Person' and a business child object 'Phone.' The business object 'Person' may contain the first and last name of a given individual. The business object 'Phone' may contain one or more phone numbers for contacting the individual identified in the 'Person' business object. When the invocation channel (124) for 'People' is called, the source object (110) which contains the business object 'Person' and related source child objects 'Phone' are passed to the invocation channel (124) and the object structure component (126) will build an eXtensible Markup Language (XML) message made up of the 'Person' business object and all its related 'Phone' business objects. This XML message captures both the content of the business objects and the relationship between the various business objects. According to one exemplary embodiment, the input to the object structure component (126) is the primary (top) business object and any other business objects to which the main object maintains a processing relationship. The output is an XML message containing the content per object structure component (126) definition.

The object structure component (126) creates this XML message by serializing the received source object (110). This serialization process retains the relationship information between the data elements within the source object (110) as well as the data elements themselves. The object structure component (126) can also retrieve additional data from internal or external sources if required. This additional data could then be formatted and included in the XML message. This XML message is then passed to the transformation layer (142).

The transformation layer (142) may be comprised of various components including custom modules A and B (128, 134), a processing class (130), and XSL maps A and B (132, 136). In one illustrative embodiment, custom module A (128) and custom module B (134) are Java classes where the customer can insert any code or operation that is desired. By way of example and not limitation, the custom modules A and B (128, 134) may contain filtering, data transformation, business logic, and/or other desirable operations. The custom modules A and B (128, 134) are normally implemented as part of a customer installation/customization. In some situations, it may be desirable to provide a base class within the custom modules A and B (128, 134) that can be extended if desired. The custom modules A and B (128, 134) operate on both the outgoing data flow and the incoming data flow. According to one illustrative embodiment, the custom modules A and B (128, 134) operate on the data flows before they are passed to the processing class (130).

The processing class (130) is a Java class where filtering, data transformation and business logic can be performed. According to one exemplary embodiment, pre-packaged enterprise resource planning adapters and integration modules may provide processing classes to support their integration functionality. The user or other logic can select the appropriate processing class functionality from the available processing classes or can use the custom modules A and B (128, 134) to implement the desired functionality. Similar to the custom modules A and B (128, 134), it may be desirable to provide a base class within the processing class (130) that can be extended if desired.

In one embodiment, the XSL maps A and B (132, 136) are eXtensible Stylesheet Language Transformations (XSLT) that perform data transformation and/or mapping of the XML message from the input format to an output format. XSL files can be implemented via an enterprise archive (EAR) file or through an absolute path reference. Using the latter allows XSL to be implemented without rebuilding the EAR file and restarting the application server. The XSL files allow for a 'no code' implementation of the invocation channel. According to one illustrative embodiment, the XSL maps A and B (132, 136) and other elements within the invocation channel (124) can be accessed through a graphical user interface that allows customization of the invocation channel (124) and its various components without any computer program coding The endpoint/handler (138) makes the actual connection between the invocation channel (124) and the external system or service (140). According to one exemplary embodiment, the endpoint/handler (138) has two distinct subcomponents, an endpoint and a handler. An endpoint contains a data structure with the information required to make a connection to a given resource or service. This information may include the service name and location, the type of connections that can be made with a given service, credentials used in making the connection, a port number, format information, and other like data. According to one exemplary embodiment, the other invocation channel (124) elements, such as the object structure component (126) or custom module A (128), can override or replace endpoint values. This allows for the dynamic selection of the external system or service (140) and the method used to connect to that external system or service (140). For example, if the invocation channel (124) logic determines that the originally designated external system or service (140) is unavailable or otherwise undesirable, the invocation channel (124) may select an alternative external service and call the appropriate endpoint/handler combination to make the connection.

In addition to an endpoint, a variety of other data structures may be used in conjunction with an appropriate handler to store the relevant system connection information in a retrievable form. By way of example and not limitation, a hashmap is a data structure that associates keys with values. The hashmap supports lookup in which, given a target or key, such as the identity of a remote server, the system finds the corresponding values to enable connection to the remote server, such as the username and password associated with the remote server.

The handler of the endpoint/handler (138) uses values collected or contained within the endpoint to make the connection to the external system or service (140). The handler first invokes a communication port and conveys the credentials to the external system or service (140) using the correct communication protocol. For example, if the handler were connecting to a remote web server, the handler would invoke a web service connection and transmit the credentials to the web server. If the credentials are accepted by the remote web server, a connection is established, the XML message is transmitted, and the desired operation is executed. One or more handlers may be configured to invoke a variety of connection types. By way of example and not limitation, the handler may invoke an "HTTP Post," write data to a Java Message Service (JMS) queue, invoke a web service connection, invoke an Enterprise Java Bean (EJB), or execute a series of commands via a command line interface.

Following the execution of the operation, or at other times, the external system or service (140) may provide a response. The invocation channel (124) may support one or more response patterns including: 'synchronous,' 'asynchronous one-way,' 'asynchronous deferred response,' or 'asynchronous call back.' The 'synchronous' response pattern refers to an invocation channel (124) that is configured to receive a response from the external system or service (140) and pass that response to the calling entity (105). The 'asynchronous one-way' response pattern refers to an invocation where there is no response returned to the calling entity (105). A third response pattern is 'Asynchronous deferred response' where the calling entity (105) retrieves a response from the external system or service (140) at later time. The fourth response pattern is 'Asynchronous call back' in which the external system or service (140) returns an identifier to the calling entity (105) that allows it to request a response or status update from the external system or service (140) at a later time.

According to one exemplary embodiment, the default configuration of the invocation channel (124) is for synchronous replies. Synchronous replies can be particularly useful when a user needs to make real time business decisions using the response from the external service (140). If the calling entity (105) is not expecting a response, the synchronous reply can simply be ignored.

The response is received by the endpoint/handler (138) and passed back through the transformation layer (142) to the object structure component (126). The transformation layer may perform a variety of tasks, including reformatting the response into an internal XML schema and passing the resulting XML message to the object structure component (126). The object structure component (126) may perform any number or type of logical operations on the response based on the external data it receives. The object structure component (126) then reformats the resulting data into a target object structure (115) and sends this target object structure (115) to the calling entity (105).

In sum, the invocation channel (124) creates a generic framework to invoke external systems or services (140) on behalf of a calling entity (105). This can be particularly advantageous in a service-oriented architecture environment where applications routinely use services provided by external applications either for processing or as part of a workflow. It allows data and services provided by external applications to be displayed in the native environment of the calling application or user interface. In many cases, this interoperability can be so transparent that the user may be unaware than an external system or service (140) is providing the data being displayed by the calling entity (105).

Further, the invocation channel (124) can be customized and used without writing code or having a working knowledge of a programming language. The invocation channel (124) is designed to be customized, if required, through modular elements. The custom modules A and B (128, 134) and other customizable elements may be accessed through a user interface which prompts the user to insert the required data and/or assemble any number of pre-built elements to accomplish the desired objective. These modular elements are easily configurable to include additional pieces of programming. The configuration and update of the various invocation channel elements or definitions can be performed without interruption to the calling entity (105) or calling application server.

The transformation between the various data formats is customizable at any point. For example, the conversion from source object/structure to an internal XML format is customizable at the object structure component (126), while the transformation from the XML format to the external format can utilize a number of pre-built modules within the processing class (130). According to one exemplary embodiment, these pre-built modules perform common transformations to interface with a number of popular external applications and services.

Figure 2:
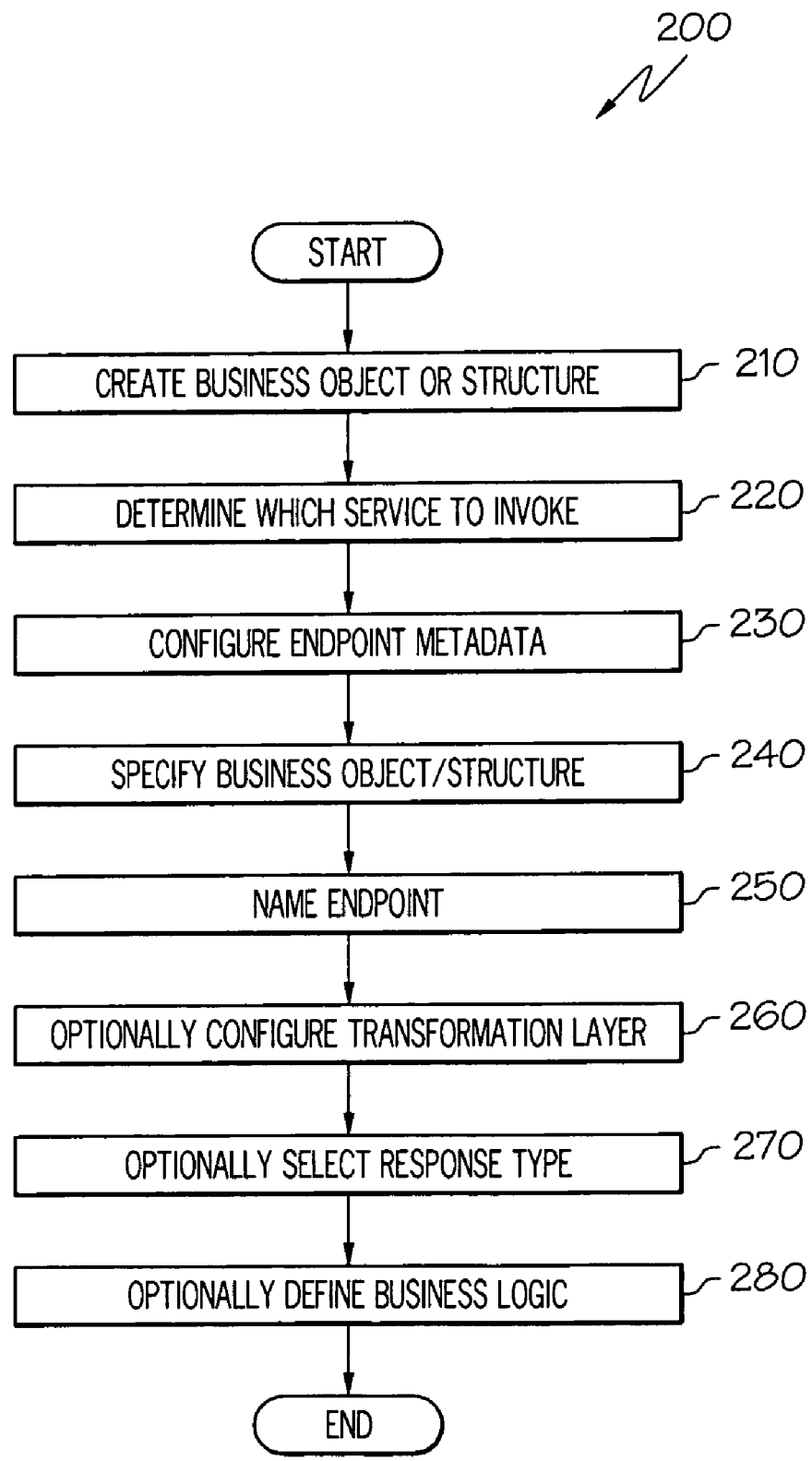
FIG. 2 is a flowchart showing an illustrative method of configuring an invocation channel, according to one embodiment of principles described herein.

FIG. 2 is a flowchart showing an illustrative method (200) of configuring an invocation channel. According to one exemplary embodiment, a graphical user interface may guide the user through a series of selections that configure an invocation channel to accomplish the desired task. The user first creates or selects a source object whose contents the user wishes to operate on (210). The user then determines which external system or service is appropriate to perform the desired operation (step 220). The endpoint metadata can then be configured to allow the handler to make the appropriate connection to the external system or service (step 230). The configuration of the endpoint defines the operation to be performed and the service that will perform the operation. The user can then invoke the invocation channel user interface and make the appropriate adjustments (if any) to the invocation channel components. The user specifies which source object the invocation channel will receive (step 240). The user then inputs or retrieves the previous configured endpoint metadata and names the endpoint (step 250). If the user is satisfied with the defaults present within the invocation channel, no additional customization is required. However, if the external system or service has a non-standard data format for which there is no pre-made processing class, the user may configure the transformation layer to make the appropriate transformations to the data flow (step 260). Additionally, if the user desires to use a response type other than the default response type, the user can select through the user interface the desired response type (step 270). If there is custom business logic that the user desires to implement, it can be inserted into one or more of the custom modules (step 280). The invocation channel is then ready to support the desired interoperability between the calling entity and the external system or service.

As described above, configuring an invocation channel can be accomplished in an entirely codeless process by simply selecting and associating various modular components. As can be seen from the flowchart shown in FIG. 2, the custom modules, processing class, and XSL maps are all optional components within the invocation channel. In circumstances where the mapping and logic contained within the object structure component are sufficient to allow communication with the external system, these optional components can be inactivated or omitted from the invocation channel. Additionally, it is possible for the registered endpoint in the invocation channel to be bypassed in the custom module and/or processing class.

Figure 3:
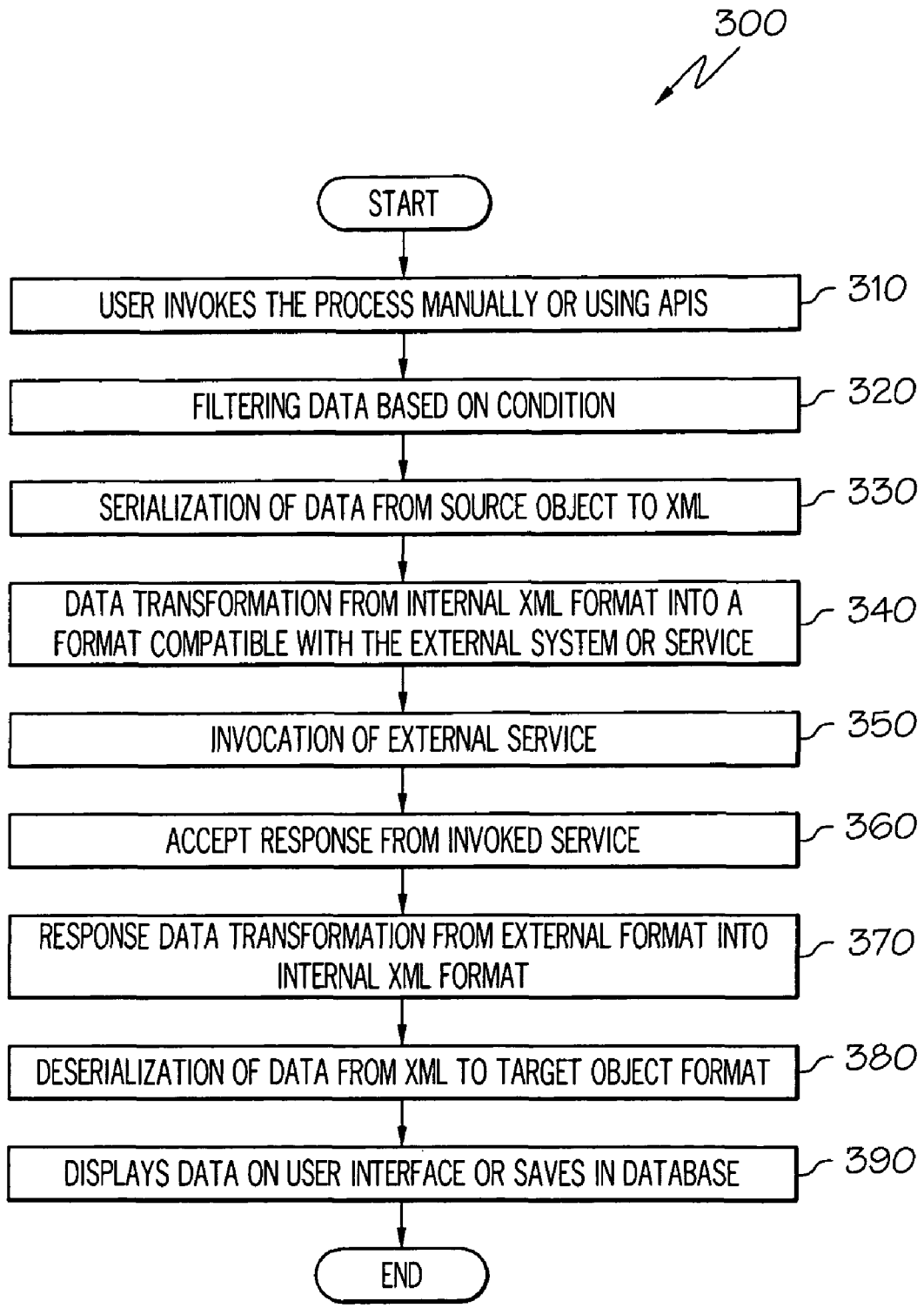
FIG. 3 is a flowchart showing an illustrative method of using an invocation channel to create interoperability between a calling entity and an external system or service, according to one embodiment of principles described herein.

FIG. 3 is a flowchart showing an illustrative method (300) of using an invocation channel to create interoperability between a calling entity and an external system or service. In a first step, the user or an automated process invokes the invocation channel (step 310) manually or using an application programming interface and passes the source object to the invocation channel. For example, a source object may be an object structure named "Purchase order" which contains a number of business objects including: a "PO header," "Contact information," "Item description," and "Item amount."

The object structure component receives the source object and performs filtering (step 320) based on one or more conditions and then serializes (step 330) data from the source object into XML format. For example, the user may desire to use an external service to perform a tax calculation on the "Item amount" object within the "Purchase order" object structure. The object structure component would extract the "Item amount" object from the larger object structure and serialize the "Item amount" into an internal XML schema. The filtering and serialization of the relevant data into an XML message transforms the source object, which may have a variety of structures and elements, into a generic XML message which still retains the required data and element relationships. The XML message facilitates the sharing of structured data across the various elements and systems within the invocation framework. This XML message is then passed to the transformation layer.

Within the transformation layer, a custom module, the processing class, and a XSL map perform the necessary operations to format the internal XML data into a format compatible with the external system or service (step 340). According to one exemplary embodiment, this transformation may be from the internal XML schema to an external XML format. One or more of the components within the transformation layer may perform the necessary transformation. By way of example and not limitation, the processing class may contain a pre-built module that converts the data formatted according to the internal XML schema into the appropriate external XML format. Where the pre-built functionality of the processing class makes the required transformation, the custom module and the XSL map would not be needed and would be inactive during the transformation process.

The formatted message is then passed to the endpoint/handler which invokes the external system or service (step 350). The handler executes the desired operation and accepts the response from the invoked system or service (step 360). For example, the handler may invoke a web service connection to a service which will perform the tax calculation on the "Item amount." The handler transmits the XML message containing the "Item amount" and waits for a response. The external service calculates the "Tax amount" and passes back an XML message containing the "Tax amount" to the handler. This response message is then passed back through the transformation layer and is reformatted from the external XML schema into the internal XML schema (step 370). In some circumstances, the internal and external XML data can be compatible and no transformation is required.

The object structure component then deserializes the XML message and transforms it into object format (step 380) and performs any other operation that is desired to define the target object. For example, the object structure component could deserialize the XML message containing the "Tax amount" and convert the "Tax amount" into a business object. The object structure component could then insert the "Tax amount" object into the "Purchase Order" object structure as a child object. The object structure component could then pass the "Purchase Order" object structure back to the calling entity as the target object. The calling entity could then display the data on a user interface or save the information in a database (step 390). For example, the calling entity may be an accounting application. The accounting application could receive the "Purchase order" object structure from the invocation channel and display the updated information including the "Tax amount."

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for creating interoperability between a calling entity and an external service comprising:
configuring an invocation channel using a codeless process;
transmitting source data from said calling entity to said invocation channel, said invocation channel formatting said data; and
transmitting said formatted data from said invocation channel to said external service;
wherein said configuring changes how said invocation channel transforms said source data from said calling entity into data for said external service.

2. The method of claim 1, wherein said configuration of said invocation channel using a codeless process is performed through a graphical user interface.

3. The method of claim 1, wherein said invocation channel can be invoked by at least one of: an application user interface, a workflow, a field validation, an event listener, an application programming interface, and an escalation.

4. The method of claim 1, wherein configuring said invocation channel comprises selecting at least one modular component configured to be plugged into said invocation channel without said user directly writing computer programming code.

5. The method of claim 1, wherein said source data is one of: a source object and a business object.

6. The method of claim 1, further comprising filtering said source data based on a filtering condition with an object structure component in said invocation channel.

7. The method of claim 1, further comprising serializing said source data to produce an eXtensible Markup Language (XML) message.

8. The method of claim 7, wherein said XML message comprises both data and metadata contained within said source data.

9. The method of claim 7, further comprising operating on said XML message with a transformation layer of said invocation channel to produce data compatible with said external service.

10. The method of claim 9, wherein said transformation layer comprises an eXtensible Sheet Language (XSL) map.

11. The method of claim 10, further comprising configuring a custom module for accessing data from additional sources.

12. The method of claim 1, wherein said invoking a connection to said external service is performed with an endpoint handler of said invocation channel, said endpoint handler being configured to supply credentials and connection information for invoking said connection to said external service.

13. The method of claim 12, further comprising overriding a configuration of said endpoint handler at runtime; said invocation channel being configured to dynamically redirect said endpoint handler during processing of said source data.

14. The method of claim 1, accepting a response from said external service with said invocation channel.

15. The method of claim 14, wherein said invocation channel is configured to support at least one of: a synchronous response, an asynchronous one-way response, an asynchronous deferred response and an asynchronous call back response.

16. The method of claim 14, further comprising performing operations based on data contained in said response from said invocation channel.

17. The method of claim 16, wherein said performing operations comprises deserializing and formatting said response into a target object, said target object being passed back to said calling entity by said invocation channel.

18. The method of claim 1, wherein said configuring said invocation channel further comprises designating said external service.

19. The method of claim 1, wherein configuring said invocation channel comprises, with a user interface, changing either a custom module or an eXtensible Sheet Language (XSL) map so as to configure said invocation channel without writing code.

20. A system comprising:
an invocation channel comprising a computing device with a user interface device, said invocation channel being configured with said user interface device, and without code writing, for receiving data from a calling entity and transforming said data to produce an external message for an external entity providing a service in response to receipt of said external message, wherein configuring with said user interface device changes how said invocation channel transforms said data from said calling entity into data for said external entity;
said invocation channel being further configured to accept a response from said external entity; wherein said invocation channel is further configured to transform said response into a target object for said calling entity, said target object being passed back to said calling entity.

21. The system of claim 19, wherein said invocation channel further comprises:
an object structure component comprising an interface for said calling entity, said object structure component configured to receive a source object from said calling entity, said source object comprising data and relationship data for a number of business objects represented by said source object, said object structure component further configured to serialize said source object into an eXtensible Markup Language (XML) message;
a custom module configured to process said XML message;
an eXtensible Sheet Language (XSL) map configured to transform said XML message for output; and
an endpoint/handler configured to create a connection with said external entity and output said XML message as output by said XSL map to said external entity.

22. A computer program product for interoperability between a calling entity and an external entity, the computer program product comprising:
a computer usable storage medium having computer usable program code embodied therewith, the computer usable program code comprising:
computer usable program code configured to accept data from said calling entity and serialize said data into an XML message;
computer usable program code configured to receive said XML message and transform said XML message with an eXtensible Sheet Language (XSL) map into a second message; said second message having a data format compatible with said external entity;
computer usable program code configured to provide a user interface with which a user can select an XSL map based on said external entity;
computer usable program code configured to invoke a connection with said external entity and communicate said second message to said external entity; and
computer usable program code configured to receive a response from said external entity, reformat said response into a target object, and transmit said target object to said calling entity.

23. An invocation channel providing interoperability between a calling entity and an external service, said invocation channel comprising a computing device comprising:
an object structure component comprising an interface for said calling entity, said object structure component configured to receive a source object from said calling entity, said source object comprising data and relationship data for a number of business objects represented by said source object, said object structure component further configured to serialize said source object into an eXtensible Markup Language (XML) message;
a custom module configured to process said XML message;
an eXtensible Sheet Language (XSL) map configured to transform said XML message for output; and
an endpoint/handler configured to create a connection with said external service and output said XML message as output by said XSL map to said external service.

24. The invocation channel of claim 23, further comprising a user interface configured to allow a user to change either said custom module or said XSL map so as to configure how said invocation channel transforms said XML message without writing code.

25. The invocation channel of claim 23, further comprising a plurality of different endpoint/handlers, wherein said invocation channel is configured to select an endpoint/handler from the plurality of different endpoint/handlers based on requirements of said external service.

26. The invocation channel of claim 23, wherein said invocation channel is further configured to obtain additional information not included in said source object and include that additional information in said XML message corresponding to said source object.

* * * * *